Feb. 20, 1934.  J. F. HALLER  1,947,592
COMBINATION GAUGE BOB AND THERMOMETER
Filed April 14, 1930
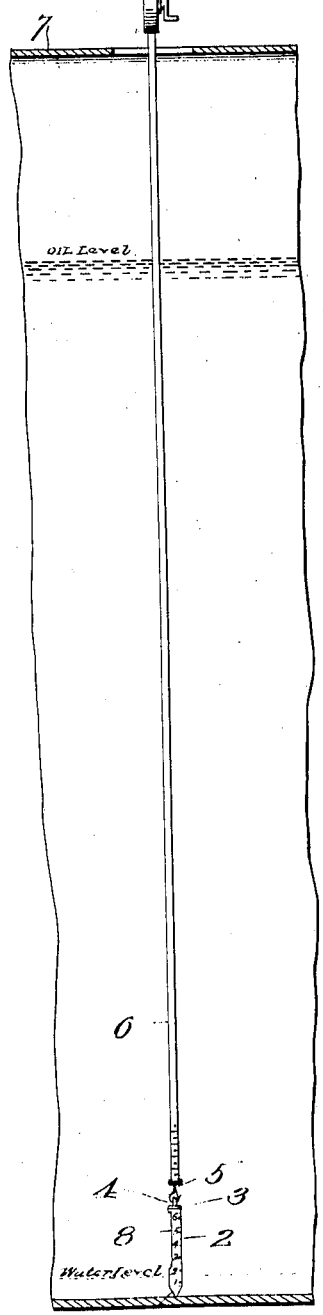
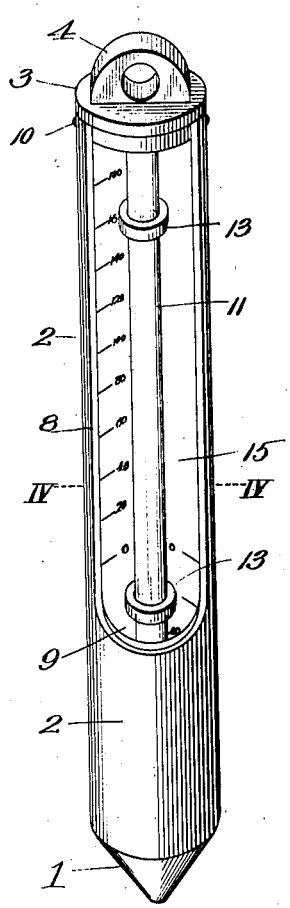
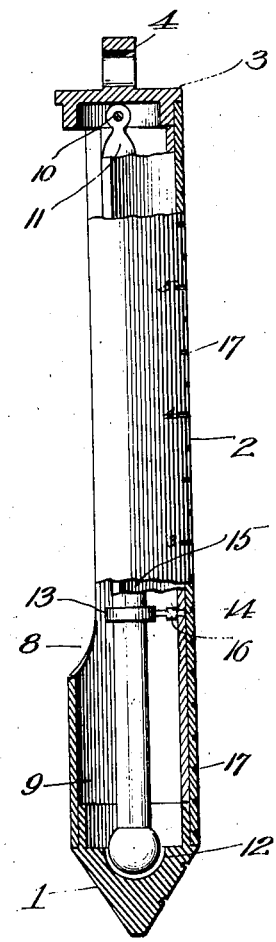
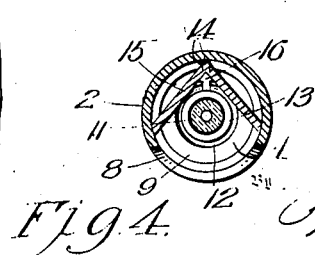
Inventor
John F. Haller
Thorpe & Thorpe
Attorneys Patented Feb. 20, 1934

1,947,592

UNITED STATES PATENT OFFICE 1,947,592

COMBINATION GAUGE BOB AND THERMOMETER

John F. Haller, Kansas City, Kans.

Application April 14, 1930. Serial No. 444,057

3 Claims. (Cl. 33—126)

This invention relates to gauge and temperature indicators for oil and gasoline tanks. It is of great practical importance in oil fields and refineries to take daily readings of the contents of the large oil and gasoline tanks, and this is customarily done early in the morning before the contents of the tanks have been affected by the heat of the sun. A reading showing oil for example, at a certain temperature and depth, will vary from a reading taken from the same tank a few hours later in the day. It is necessary therefore for the readings to be taken at an early hour, as otherwise the records of the contents of the tanks will not be dependable.

Heretofore it has been customary for two men to make the readings, one man lowering a gauge through an opening in the top of the tank for the purpose of ascertaining the depth of the oil, and the second man immediately afterwards lowering a thermometer into the tank for the purpose of determining the temperature of the oil.

My object is to produce a combined device which will enable a single attendant to render this service in the same or less time than is now required by the two-man method mentioned. A further object is to provide a device which will give the true temperature reading, and this is important in weather of very low temperature, particularly when the level of the oil in the tank is low. Another object is to make provision for at the same time indicating the depth of water underlying oil in a tank.

With the objects mentioned in view the invention consists in certain novel and useful features of construction and combinations of parts as hereinafter described and claimed; and in order that it may be fully understood, reference is to be had to the accompanying drawing, in which:

Figure 1 is a fragmentary vertical section of a tank for oil, gasoline and the like, with my device operatively applied for simultaneously indicating the depth and temperature of the contents and the depth of underlying water in the tank.

Figure 2 is a perspective view of the device with the tapeline omitted.

Figure 3 is a view partly in side elevation and partly in central vertical section of the device with the tapeline omitted.

Figure 4 is a horizontal section taken on the line IV—IV of Figure 2.

Referring to the drawing in detail, the device is constructed as follows: 1 indicates a relatively heavy conical tip or point, 2 a cylindrical sleeve secured to the tip, and 3 a cap secured to the upper end of the sleeve, the parts being so proportioned as to constitute a plumb bob, and the cap has an upstanding perforated lug 4 for engagement by a snap hook 5 secured to the lower end of a steel tape 6, which is unwound for the purpose of lowering the device into tank 7 through an opening in the top thereof.

The sleeve 2 is provided with an elongated slot or opening 8 extending preferably from the upper end of the sleeve for about three quarters of the length of the latter, the lower or unslotted portion of the sleeve forming a cup 9 which will collect a small quantity of the oil or gasoline and withdraw it from the tank when the tape is wound up.

As indicated a cross pin 10 fastens the cap 3 to the sleeve, and said pin forms a suspension point for a thermometer 11 which extends down through the sleeve and preferably into a small pocket 12 formed in the tip 1, and to protect the gauge against danger of fracture, one or more bands 13 fit snugly around it and are provided with stems 14 which are fastened to a preferably right-angle shaped plate 15 fitted within the sleeve and bearing at its lower end upon the tip and at its upper end against the cap, and said stems are provided with shoulders 16 so that before the angle plates are fitted in the sleeve, there can be no sliding of the stems through the plates which might permit the thermometer tube to strike against the plate and be fractured thereby.

The angle plate may function not only to guard against swinging movements of the thermometer, but may also bear scale markings, as shown, which markings should conform to or register with the customary markings (not shown) on the thermometer itself. In fact if the parts are made in exact proportion the thermometer tube would not have to be marked, and it might be easier to read the temperature indication upon the plate than upon the tube itself because the scale markings could be made heavier and longer. However it is necessary that one or the other should bear the proper scale markings so that the temperature may be read at a glance.

For the purpose of indicating the water level, which in large size tanks seldom exceeds two inches, linear markings, such as horizontal vertically spaced notches 17 are provided in the device, and chalk is rubbed into the notches before the device is lowered into the tank, which chalk upon encountering the water is washed or cut out of the notches but is not obliterated by oil or gasoline. As a result therefore when the device is withdrawn from the tank, an inspection of the notches will show at a glance the topmost one from which the chalk has been washed out and thus give the depth of water under the oil or gasoline. In withdrawing the device from the tank, the level of the oil will be indicated on the linear markings of the steel tape and record made thereof due allowance being made for the depth of the underlying oil indicated on the plumb bob, and when the withdrawal is complete the thermometer will be inspected to determine the temperature of the oil and notation made thereof, it being noted in this connection that the pocket or chamber 9 will be filled with oil or the like when the device is withdrawn and the oil or gasoline not being quickly affected by outside temperatures, will give an accurate reading of the temperature of the body of oil or gasoline within the tank. Lacking the pocket or chamber to withdraw a quantity of oil or gasoline, it will be apparent, especially if the oil level is relatively low in the tank and the outside temperature very low, that a lower temperature would be indicated by the thermometer by the time it reached the hand of the operator than when it emerged from the oil. The reading with the oil still influencing the thermometer when it reaches the top of the tank, is therefore more accurate than under the other condition mentioned and the pocket is a very desirable feature of the device.

The engineering or office force, knowing the volume and the temperature of the oil or gasoline at a fixed early hour in the day, will likewise through computation, experience and observation, know what the reading and volume should approximately show at a later hour in the day, and for this reason the accounting system can be made more accurate and indicate more truly the content volume and value of a particular tank at any particular time.

A device of the kind described, can be handled with great facility and ease, and while the drawing illustrates the preferred construction of the device, it is to be understood that it is susceptible of modification in minor particulars without departing from the principle of construction and mode of operation involved or from the spirit and scope of the appended claims.

I claim:

1. In a device of the character described, a hollow plumb bob provided with a side opening and a bottom pocket below and in communication with said opening, and a thermometer extending centrally within the plumb bob opposite said opening and downward into said pocket, said bob also having external depth gauge notches for containing material which will be cut by water but not by oil or gasoline from said notches, in combination with a measuring tape secured at its lower or outer end to the upper end of the plumb bob for effecting lowering and raising movement of the latter and for indicating tank content levels.

2. In a device of the character described, a hollow plumb bob provided with a side opening and a bottom pocket below and in communication with said opening, and a thermometer extending centrally within the plumb bob opposite said opening and downward into said pocket; said plumb bob having external depth gauge notches for containing material which will be cut by water but not by oil or gasoline from the notches.

3. A depth gauging and temperature taking device for liquid hydrocarbons, comprising a line having linear markings to indicate depth readings, a casing suspended from the line and having linear markings coacting with the linear markings of the line, certain of the linear markings on the casing being indicated by notches adapted to contain a material unaffected by liquid hydrocarbons but affected by water, and a thermometer carried by said casing.

JOHN F. HALLER.